May 15, 1945. M. J. ZUCROW 2,376,108
INTEGRATOR
Filed June 4, 1941 4 Sheets-Sheet 1

Inventor.
Maurice J. Zucrow
By Albert I. Kegan
Attorney.

May 15, 1945.    M. J. ZUCROW    2,376,108
INTEGRATOR
Filed June 4, 1941    4 Sheets-Sheet 2

Inventor.
Maurice J. Zucrow
By Albert I. Kegan
Attorney.

May 15, 1945.   M. J. ZUCROW   2,376,108
INTEGRATOR
Filed June 4, 1941   4 Sheets-Sheet 3

INVENTOR
Maurice J. Zucrow
BY Albert L. Kegan
ATTORNEY

May 15, 1945. M. J. ZUCROW 2,376,108
INTEGRATOR
Filed June 4, 1941 4 Sheets-Sheet 4
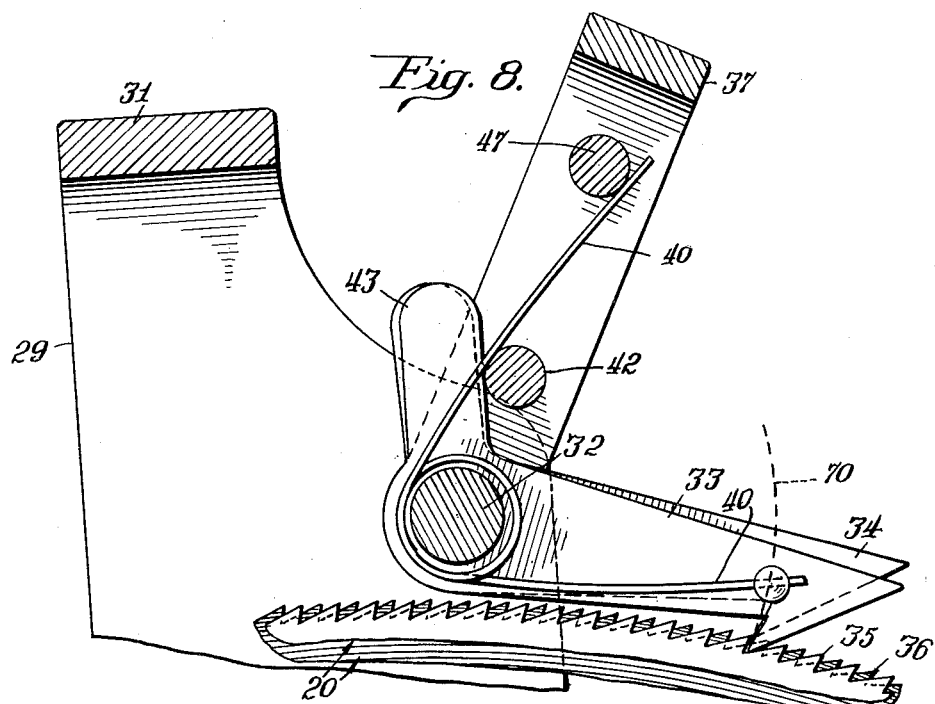
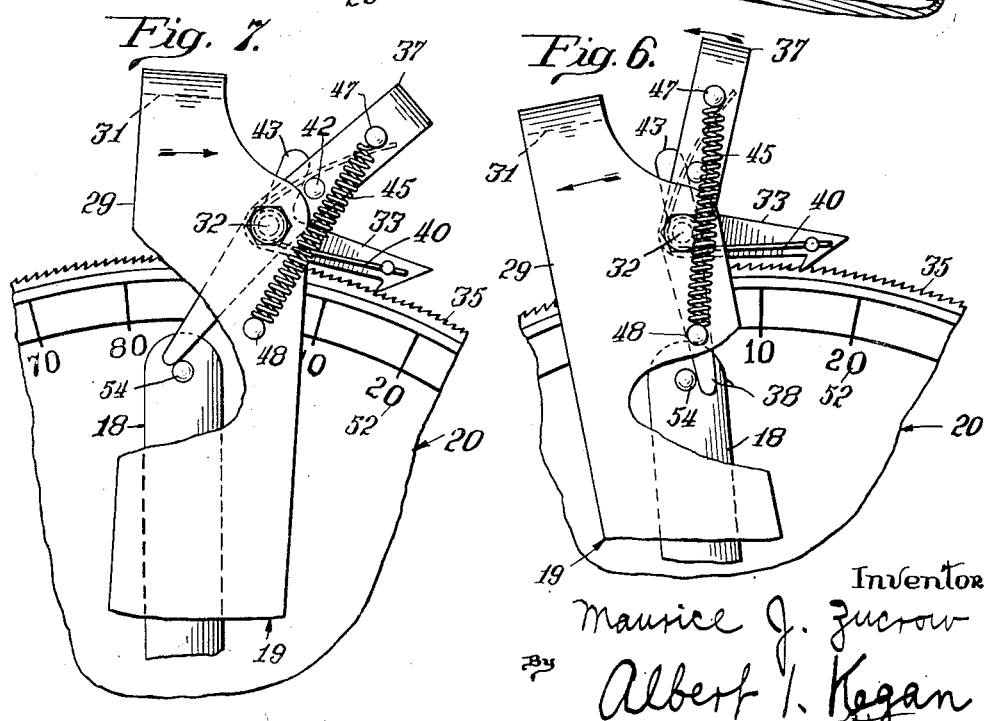
Inventor
Maurice J. Zucrow
By Albert I. Kegan
Attorney.

Patented May 15, 1945

2,376,108

UNITED STATES PATENT OFFICE 2,376,108

INTEGRATOR

Maurice J. Zucrow, Chicago, Ill., assignor to Ring Balance Instrument Company, Chicago, Ill., a corporation of Illinois Application June 4, 1941, Serial No. 396,588

8 Claims. (Cl. 74—116)

This invention relates to improvements in measuring devices, and more particularly to devices which summate successive measurements of intensity and convert the same into readings of total quantity. More specifically, the invention relates to measuring instruments in which intensity or rate is measured by an angular or a linear displacement, and quantity is determined and registered by integrating said displacements over a period of time. While the invention is illustrated and described herein with special reference to mechanical flow meters, it is to be understood that the invention is adapted for use wherever it is desired to integrate continuously varying displacements, from which it is apparent that the instant invention has a wide field of industrial utility.

It is a principal object of the present invention to provide an indicating integrating meter of improved accuracy, dependability, and flexibility.

Another object is to provide an improved integrator which possesses a high degree of accuracy, and will maintain the same over long periods of use.

Another object is to provide a device which accurately integrates small values of a variable.

Another object is to provide an improved integrator in which mechanical disturbance during the integrating cycle is minimized and substantially eliminated.

Still another object is to provide an improved mechanism which integrates instantaneous values of the variable under measurement.

Yet another object is to provide a mechanism the accuracy of which is unaffected by fluctuations in the magnitude of the variable to be integrated, even though said fluctuations occur while the mechanism is registering a value of the variable.

A still further object is to provide an improved, simplified integrator construction in which the principal parts are mounted on but one shaft for convenience in assembly and adjustment.

Another object is to provide a construction in which the pawls do not drag over the ratchet teeth, nor yet over a shroud interposed between said teeth and the pawls.

Another object is to provide a tripping out mechanism which does not introduce error or subject the ratchet teeth to undue wear or stripping.

Yet another object is to provide a time cycle assembly which is not subject to jamming.

Another object is to provide an improved integrating mechanism which may be calibrated, checked and adjusted with maximum ease and in the simplest possible manner.

The principal disadvantages of previously known integrating devices are that they are difficult to calibrate, check, and adjust; that they are subject to certain inherent sources of error, particularly at low values of the variable being integrated; and that they rapidly become less accurate with use and wear. Most mechanical integrators of the wheel type require two pawls for each ratchet wheel, and are so constructed that at least one pawl is always dragging over the ratchet teeth, with the result that both the pawls and the ratchet teeth rapidly become worn, so that positive engagement gives way to slipping, and the instrument becomes inaccurate and unreliable. These disadvantages are obviated by the present invention.

The objects above set forth are attained by my improved integrator construction, which is characterized by the following features: (1) The principal assemblies are mounted upon a single main shaft. (2) Each such assembly is symmetrically disposed with respect to a central plane perpendicular to said main shaft, whereby substantial balance is obtained and dependable accuracy may be maintained over long periods of use. (3) The mechanism for engaging and disengaging the index wheel assembly is mounted upon the time-cycle assembly in such a manner that shock or vibration will not jam the mechanism. (4) The operations of integration are confined to a relatively flat arc on the upper portion of the integrating wheel assembly, whereby a high degree of reliability in operation is obtained. (5) The number of ratchet teeth subtending the angular deflection corresponding to the value of the variable being integrated is so large as to secure great precision in integration, even when the values of the variable are small.

The foregoing and such other advantages, objects, and capabilities as may appear herein or be pointed out as this description proceeds, or as are inherent in the present invention, are illustrated in the accompanying drawings, in which:

Figure 6 is a front elevational detail view of a portion of the integrator mechanism at the moment of disengagement of the time cycle assembly from the index wheel assembly, a portion of the time cycle link having been broken away to show the indexing lever in contact with the toggle lever tripping arm.

Figure 7 is quite similar to Figure 6 and shows the manner in which the toggle and pawls subassembly is recocked after having been tripped accidentally.

Figure 8 is an enlarged front elevational detail view of a vertical section taken through the upper portion of the time cycle assembly just behind the front toggle lever tripping arm. The adjacent portion of the index wheel assembly also is shown.

Figure 1:
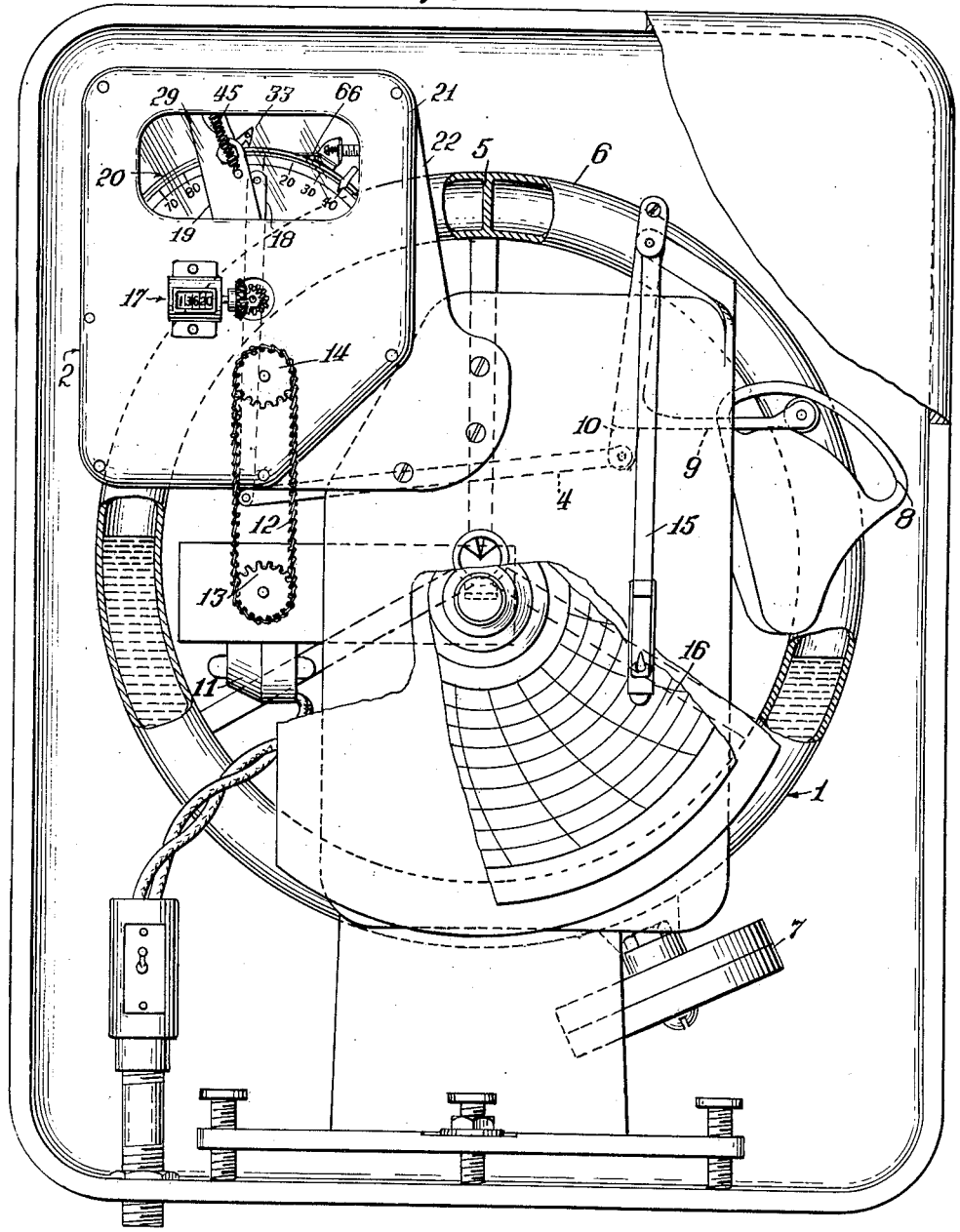
Figure 1 is a front elevational view of a recording, integrating and indicating ring-balance mechanical flow meter, with the cover and portions of the recording chart, chart support and ring body broken away to show certain details of the construction.

Like reference characters are used to designate similar parts in the drawings and in the description of the invention which follows. In said description, the calibrated face of the index wheel assembly and all parts on the same side of the index wheel spacer as said calibrated face are referred to as "front," while similar parts situated on the opposite side of said spacer are referred to as "rear." Directions of rotation are described from the point of view of one observing said calibrated face.

Referring now more particularly to the drawings, Figure 1 discloses a measuring device 1 (hereinafter referred to as the primary meter), in combination with my improved integrating device 2. Purely for purposes of illustration, said primary meter 1 is herein exemplified by a ring-balance mechanical flow meter.

The aforesaid combination operates in the following manner: The factor which it is desired to measure (flow of fluid, for example) is converted by suitable apparatus, such as a Venturi tube, into a differential pressure, which is transmitted to the primary meter 1 and applied to the partition 5 therein. The torque thereby created causes the ring body 6 to rotate until said torque is counterbalanced by the torque due to the external counterweight 7. The angular deflection of the ring body from its zero position is a direct measurement of the net force applied to the partition 5. By means of the cam 8, the aforesaid deflection is converted into an angular displacement of the vertical branch of the L-shaped arm 9 about the point whereat said arm 9 is pivoted to an ear formed in a plate suitably supported in the casing. Said cam 8 is so shaped, and said arm 9 is so proportioned and pivoted, that said angular displacement is directly proportional to the rate of flow.

Said arm 9 may be connected to a pen arm 15, whereby the aforesaid displacement may be recorded in a suitable manner, as for example, upon a chart 16 graduated with respect to time and rate of flow or percentage of maximum rate of flow. By means of a synchronous electric motor or other form of clock 11, said chart may be rotated at a uniform rate, whereby the recording device upon the pen arm 15 will inscribe a continuous record of the rate of flow at every instant of time.

By means of the connecting link 4, which is pivoted to the lug 10 upon the L-shaped arm 9, the displacements of said arm 9 are also transmitted to the integrator 2, which summates said displacements with respect to time. If the displacements represent instantaneous rates of flow, for example, the integrator 2 may be utilized to calculate the total quantity of fluid which has flowed through the Venturi tube during any specified interval of time, said quantity being indicated on the counter 17 in predetermined units, such as cubic feet or gallons.

While Figure 1 illustrates the integrator 2 as summating displacements caused by rotating a ring-balance, it is distinctly to be understood, nevertheless, that my improved integrator is adapted to summate displacements, whether angular or linear, no matter how produced, so that said integrator may be used in combination with the most diverse variety of indicating or measuring devices. Thus it will be appreciated that the instant invention has a wide field of industrial utility.

Figure 2:
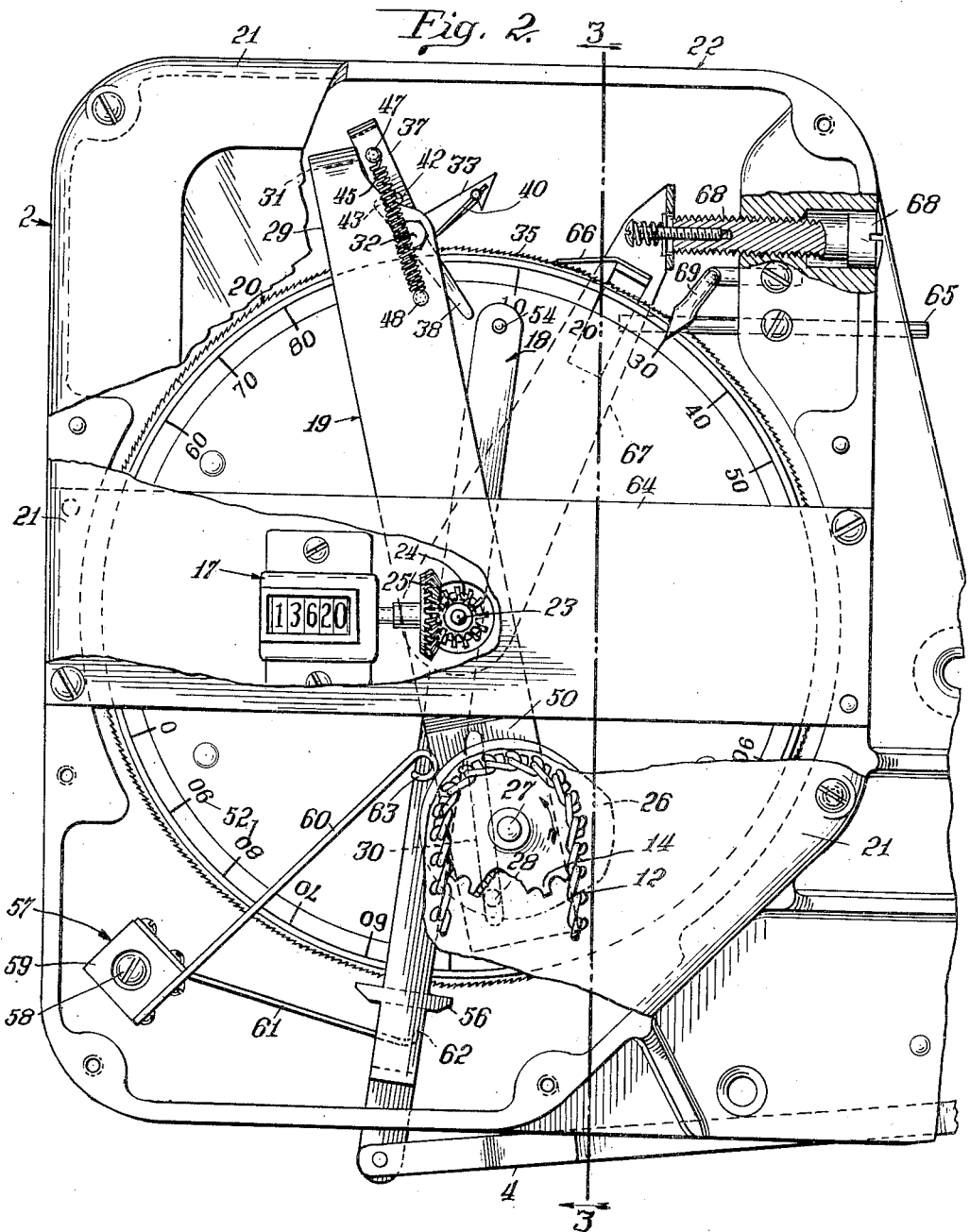
Figure 2 is a front elevational view of the integrator, with portions of the housing cover broken away to show the mechanism.
Figures 3, 4, 5:
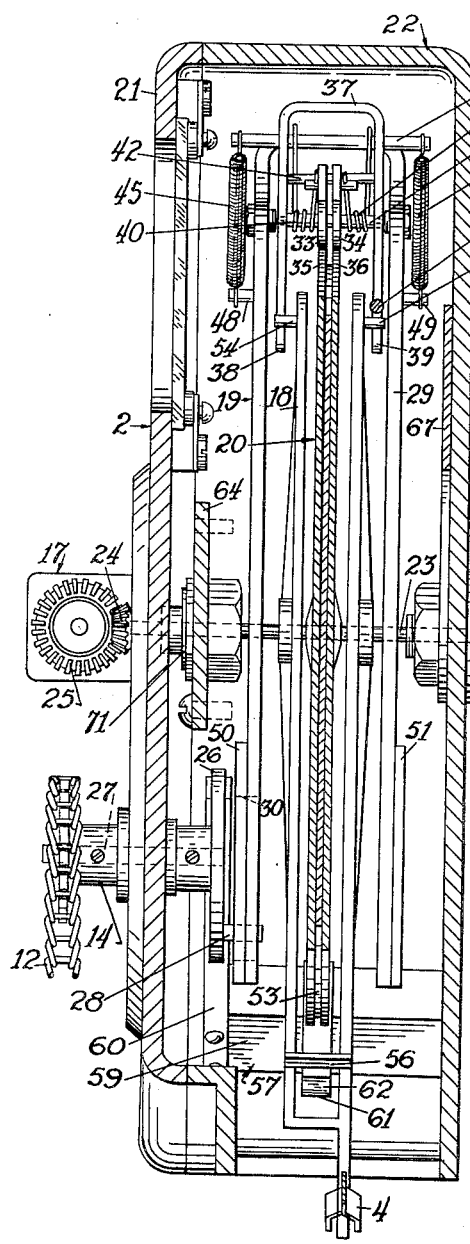
Figure 3 is a side elevational sectional view taken on the line 3—3 of Figure 2.
Figure 4 is a fragmentary detail view in perspective of a portion of the integrator mechanism at the beginning of its cycle of operation.
Figure 5 is somewhat similar to Figure 4, and shows the integrator mechanism at a later stage in its cycle of operation.

Referring now to Figures 2 and 3, it will be observed that the integrator comprises five principal groups of mechanism—namely, the indexing lever 18, the brake assembly 57, the time cycle assembly 19, the index wheel assembly 20, and the counter assembly 17. The counter assembly 17 is mounted on the cover 21 of the integrator housing 22; the brake assembly 57 is attached to the bottom of the integrator housing 22; the three other assemblies are mounted upon the integrator main shaft 23, which in turn is supported by the rear wall of the integrator housing 22 and the front bearing strap 64, as is clearly shown in Figure 3.

In the arrangement illustrated in Figure 1, the synchronous motor or clock 11 actuates the integrator 2 by means of the sprocket gears 13 and 14 and the drive chain 12. The rotation of the driven gear 14 oscillates the time cycle assembly 19 (Figure 2). Said time cycle assembly may be oscillated, however, by any suitable means.

On each counterclockwise excursion, said assembly engages the index wheel assembly 20 and rotates it until the two are disengaged by contact of the time cycle assembly with the indexing lever 18. The angular position of said indexing lever is controlled through the connecting link 4 by the primary meter 1. Thus it will be seen that the extent of rotation of the index wheel assembly in any given excursion of the time cycle assembly is a function of the meter position at the instant the time cycle assembly makes contact with the indexing lever. In other words, my improved device integrates the actual position of the primary meter at the very moment the integrating cycle is completed, and not the meter reading at some indeterminate point in the integrator's cycle of operation.

The rotation of the index wheel assembly is transmitted through the bevel gears 24 and 25 to the counter 17. Said counter therefore indicates the total revolutions of the index wheel assembly. By means of the proper ratio between the bevel gears 24 and 25 or by means of suitable gears within the counter, said counter may be made to register in any predetermined units, such as gallons or cubic feet. If desired, the counter may be mounted at any convenient point, and may be driven through any suitable means, as for example a flexible shaft or a universal shaft operatively connected with the index wheel assembly or the shaft to which the latter is fixed.

Turning now to a more detailed consideration of the mechanism, and especially to Figures 2 and 3, it is to be observed that the integrator is driven by the clock crank assembly, which comprises the sprocket gear 14, the crank shaft 27, the crank disk 26, and the drive pin 28. Said crankshaft 27 turns in a bearing in the housing cover 21. The sprocket gear 14 lies outside said cover and is fixed to one end of said shaft 27. The crank disk 26 is fixed to the other end of said shaft 27 and is positioned between the housing cover and the front of the time cycle assembly. Said crank disk 26 also serves as an edge cam to operate the friction brake assembly 57. Protruding from the face of the disk 26 is the crank drive pin 28, which rides in the cam slot 30 of the time cycle assembly. Since the clock crank assembly turns as a unit, each complete revolution of the sprocket 14 by the clock 11 causes the time cycle assembly to oscillate through one cycle, comprising a counterclockwise excursion and a clockwise excursion.

The time cycle assembly 19 preferably comprises a substantially U-shaped lever 29 and a toggle and pawls subassembly mounted thereon at the top thereof. Said time cycle lever 29 straddles the index wheel assembly 20, and is rotatably mounted on the integrator main shaft 23. This construction avoids the use of overhanging shafts, minimizes bearing loads, and makes possible excellent alignment of the bearings. Further, the time cycle assembly is substantially balanced with respect to its axis of rotation by means of counterweights 50, 51 (Figure 3). The front leg of the lever 29 is slotted near the bottom thereof to form a linear cam 30 adapted to receive the drive pin 28.

The toggle and pawls subassembly is shown in somewhat enlarged perspective views in Figures 4 and 5. Said subassembly comprises an U-shaped toggle lever 37 and a plurality of index pawls 33, 34 pivoted upon a shaft 32, a plurality of torsion springs 40, 41 (one torsion spring for each pawl), a front tension spring 45 anchored to the pin 46 in the time cycle link 29 and connected to the toggle lever spring shaft 47, and a corresponding rear tension spring 46 anchored to the pin 49.

The time cycle assembly is provided with one index pawl for each ratchet wheel in the index wheel assembly, and each index pawl is spaced upon the pawls shaft 32 so as to enable it to engage the teeth upon the periphery of the ratchet with which it is designed to cooperate. The pawl springs 40, 41 (Figure 3) are adapted to maintain the index pawls in operative engagement with the ratchets, whereby the time cycle assembly is enabled to rotate the index wheel assembly in a counterclockwise direction. The toggle lever springs 45, 46 are positioned with respect to the pawls shaft 32 so as to resist tripping of the toggle lever 37, as well as cocking thereof. Thus said springs 45, 46 tend to retain the toggle and pawls subassembly in cocked position after cocking, and in tripped position after said subassembly has been tripped.

At the end of the time cycle assembly's clockwise excursion, said subassembly is tripped by contact of the rear toggle lever tripping arm 39 with the toggle engagement trip pin 65 (Figure 2). Said trip pin 65 is fixed to the integrator housing by means of a set screw, and is adjustable. When said pin 65 trips the toggle lever 37, the index pawls 33, 34 fall upon the pawls engaging plate 66, and, as the time cycle assembly begins its counterclockwise excursion, said pawls leave said plate and engage the index wheel assembly. Said pawls engaging plate 66 is mounted upon the calibration bracket 67, which lies against the back of the integrator housing 22. Said calibration bracket 67 is pivoted upon the integrator main shaft 23, and can be rotated slightly by means of the adjusting screw 68, whereby the position of the pawls engaging plate 66 may be adjusted so as to obtain maximum accuracy in the integrator readings.

Referring to Figures 2 and 3, it will be seen that the index wheel assembly comprises a plurality of ratchet wheels 35, 36, spacer plates (such as the plate 53) between adjacent ratchet wheels, and calibrations 52 upon the front face of the index wheel assembly. Said ratchet wheels and spacer plates are rigidly fastened together to form a single laminated structure, the hub of which is secured to the integrator main shaft 23. It is to be noted that the index wheel assembly is fastened to said main shaft 23; hence rotation of the former causes the latter to be rotated to an equal degree. The indexing lever 18 and the time cycle assembly 19, on the other hand, are merely pivoted upon said main shaft 23, and do not rotate with the latter.

The ratchet wheels 35, 36 are circular disks having undercut ratchet teeth upon their respective peripheries. Engagement of one of the time cycle index pawls with one of these ratchet teeth enables the time cycle assembly to rotate the index wheel assembly. This rotation is transmitted through the integrator main shaft 23 and the bevel gears 24 and 25 and is registered upon the counter 17. A friction washer 71 (Figure 3) preferably is placed upon the shaft 23 between the bearing for said shaft and a collar on said shaft 23, to prevent coasting of the index wheel assembly after it has been disengaged from the time cycle assembly. Such coasting otherwise might occur if the integrator were exposed to excessive external vibration.

While wheel integrators have long been known, they have not found favor in many applications because they were subject to grave error when integrating small values of the variable under measurement. This defect is obviated by my improved construction, which is set off from prior-art constructions by certain critical limits.

To attain a high degree of accuracy (1) the engagement of the pawl with the ratchet must be positive throughout the entire integrating cycle and (2) the error due to slack in engaging the ratchet must be insignificant.

I achieve the aforesaid positive engagement (a) by the toggle and pawls construction previously described herein, which in its operation subjects the ratchet teeth to very little wear, so that even in an old and much used instrument there is no error due to slipping of a blunted pawl over rounded worn teeth; (b) by the use of index wheels constructed with relatively large, undercut ratchet teeth; and (c) by a construction and arrangement of parts such that the time cycle assembly engages the index wheel assembly only along a relatively flat arc on the upper portion thereof.

In order that the error due to slack may be insignificant, the pitch of the ratchet must be less than the peripheral displacement produced by the minimum force to which the primary indicator is responsive. This I accomplish (a) by increasing the circumference of the index wheel assembly without increasing the size of the ratchet teeth, in order that the net angular pitch may be less than the angular deflection produced by the aforesaid minimum actuating force, and (b) by decreasing the net angular pitch of the index wheel assembly to a fraction of the angular pitch between teeth on any one ratchet wheel. The latter result is achieved by laminating together a plurality of identical ratchet wheels in rotationally spaced relationship, so that the teeth of each ratchet are rotationally out of phase with respect to the teeth of each of the other ratchets in the assembly. This arrangement is illustrated at Figure 8. Since the time cycle index pawls are in strict alignment on a shaft parallel to the rotational axis of the index wheel assembly, the combination is equivalent to a single pawl and ratchet in which the pitch of the ratchet is equal to the quotient of the pitch of the component index wheels divided by the number of index wheels in the index wheel assembly.

The front face of the index wheel assembly is calibrated for purposes of checking and adjusting the integrator, and a calibration pointer 69 is provided to facilitate reading the position of the index wheel assembly.

As is shown in Figure 3, the indexing lever 18 is pivoted upon the integrator main shaft 23. Said indexing lever is bifurcated at the lower end thereof to form two upstanding prongs which straddle the index wheel assembly and in turn are straddled by the front and rear branches of the time cycle lever 29. Said indexing lever prongs are provided near the upper tips thereof with protruding pins 54, 55, adapted to trip the toggle lever 37 upon contact with the toggle lever tripping arms 38, 39. The unbifurcated lower end of the indexing lever 18 is connected to the primary meter by the connecting link 4: thus the angular position of the indexing lever 18 always is a function of the deflection of the primary meter 1. The indexing lever 18 is provided with a brake-engaging web 56 positioned between the upstanding prongs thereof near the bottom of said lever 18. Said web 56 is adapted to cooperate with the friction brake assembly 57.

As is shown more especially in Figure 2, said brake assembly comprises a shaft 58, a hub 59, a cam lever 60 attached to said hub and adapted to cooperate with the disk cam 26, and a flat spring 61 also attached to said hub 59 and having a contact finger 62 adapted frictionally to engage the web 56.

The construction of the integrator and its parts having been described, the action thereof through a complete cycle of operation will now be more fully explained.

Figure 4 shows the upper portion of the time cycle assembly at the beginning of its counterclockwise excursion. Said time cycle assembly is in this relative position when the clock crank assembly is in that phase of its rotation where the crank drive pin 28 (see Figure 2) is in its extreme position to the left. As is clearly shown in Figure 4, the toggle lever 37 is in tripped position, and the teeth of the index pawls 33, 34 rest upon the pawls engaging plate 66. Gravity and the toggle lever springs 45, 46 cooperate to maintain said toggle lever 37 in tripped position.

As the clock crank assembly continues in counterclockwise rotation, the upper portion of the time cycle assembly moves to the left. The parts are then in the position shown in Figure 5. The teeth of the index pawls 33, 34 are drawn down the pawls engaging plate 66, and make contact with the index wheel assembly. As the time cycle assembly continues to the left, one of the index pawls engages a tooth on the index wheel over which it is being drawn. In Figure 5, the front index pawl 33 is illustrated as being so engaged, gravity and the front pawl spring 40 cooperating to make the engagement positive. As the time cycle assembly continues to the left, the index wheel assembly is drawn with it, thereby rotating the integrator main shaft 23. By means of the bevel gears 24 and 25, this rotation is indicated upon the counter 17.

As the time cycle assembly moves into the position illustrated in Figure 5, the disk cam 26 (see Figure 2) lifts the cam roll 63 and thereby raises the brake spring contact finger 62. Said finger 62 will frictionally engage the brake engaging web 56 if the indexing lever 18 is at this moment in a position corresponding to less than about twenty-five percent of the maximum deflection of the primary meter. Said frictional engagement prevents mechanical disturbance of the indexing lever due to impact of the toggle lever tripping arms 38 and 39 against the trip pins 54 and 55 at the moment the time cycle assembly is disengaged from the index wheel assembly.

The latter operation is illustrated in Figure 6. As the time cycle assembly continues its excursion to the left, the toggle lever tripping arms 38, 39 strike the toggle trip pins 54, 55, whereby the toggle lever 37 is thrown into cocked position against the cross arm 31 of the time cycle link 29. Because of the engagement of the toggle lever pawl stop 42 (see Figures 5 and 8) with the pawl heels 43, 44, cocking said toggle lever 37 causes the index pawls 33, 34 to be rotated out of operative contact with the index wheel assembly, and to assume the position shown in Figure 2.

The center of rotation of the pawls is above their point of engagement, so that the tooth of each index pawl moves toward the right along the arc indicated at 70 in Figure 8 as said pawl is disengaged from the index wheel ratchet. Thus there is no mechanical disturbance of the index wheel assembly during the tripping-out operation, nor is there any wearing action on the ratchet teeth.

The bifurcated, symmetrical construction of the toggle lever and of the indexing lever eliminate side thrust during their engagement with each other, so that wear of the parts does not result in undue lag or play. The impact of the toggle lever tripping arms 38, 39 upon the toggle trip pins 54, 55 has a slight tendency to move the indexing lever to the left. At low values of the variable under measurement, the operating torque of the primary meter 1 is small, and the aforesaid impact may transmit sufficient force through the linkage 4, 10, 9 to joggle the pen arm 15 slightly. Such joggling is prevented, however, by frictional engagement of the spring contact finger 62 with the brake engaging web 56. The cam 26 causes said engagement to occur whenever a small deflection is to be summated by the integrator. The frictional resistance introduced by engagement of the contact finger 62 with the web 56 is insufficient, however, to interfere with movement of the indexing lever 18 in response to fluctuations in the variable under measurement. Thus it will be understood that the indexing lever 18 is free to move at all times, and that my improved integrator summates the exact quantity corresponding to the position of the primary meter 1 at the very instant of contact of the indexing lever with the toggle lever.

After the toggle and pawls subassembly has been cocked by contact with the indexing lever, the time cycle assembly continues its excursion to the left, the toggle and pawls subassembly being retained in cocked position by the tension of the toggle lever springs 45, 46. Further rotation of the clock crank assembly starts the time cycle assembly on its return excursion. The index pawls do not drag across the ratchet teeth of the index wheels, but remain in elevated position, so that there is no wear upon either the ratchets or the pawls. With the toggle lever 37 cocked, the tripping arms 38, 39 clear the indexing lever 18 on the return excursion without making contact with the trip pins 54, 55.

At the end of the return excursion of the time cycle assembly, the rear toggle lever tripping arm 39 strikes the toggle engagement trip pin 65, whereby the toggle and pawls subassembly is tripped and the index pawls fall upon the pawls engaging plate 66. The apparatus is then in the position shown in Figure 4, having completed its cycle of operation.

Thus it will be apparent that, in each complete excursion of the time cycle assembly, the index wheel assembly is rotated through an angle defined by the positions of the calibration bracket 67 and the indexing lever 18. The integrator therefore may be adjusted by rotating the calibration bracket 67, which adjustment is accomplished by turning the calibration bracket adjusting screw 68. Only one adjustment is necessary, no matter whether the integrator is reading too high or too low.

Furthermore, checking the adjustment of my improved integrator is extremely simple. When the integrator is properly adjusted, the difference between two readings at the calibration pointer 69 taken one minute apart is exactly equal to the reading of the primary meter 1 (as recorded, for example, upon the chart 16). If this is not the case, the integrator is corrected by adjusting the calibration bracket as explained above.

Extraneous mechanical shock occasionally may succeed in tripping the toggle and pawls subassembly while the time cycle assembly is to the left of the indexing lever. My improved construction avoids jamming in this situation, and causes the toggle and pawls subassembly automatically to be recocked, as is illustrated in Figure 7. When the toggle lever 37 is in tripped position, the toggle lever tripping arms 38, 39 are dragged across the toggle trip pins 54, 55 as the time cycle assembly traverses the indexing lever 18 from left to right. This rotates the toggle lever 37 upon the pawls shaft 32 in a clockwise direction until the apparatus is in the configuration shown in Figure 7. Said rotation of the toggle lever increases the torsion exerted by the pawl springs 40, 41, and, as the tripping arms 38, 39 clear the pins 54, 55, the reaction of said pawl springs 40, 41 throws the toggle and pawls subassembly back into cocked position.

Thus it will be seen that I have fully disclosed the construction and operation of a new and improved integrator which is characterized by simplicity, sturdiness, and balance in its construction, by ease and certainty in checking and adjustment, and by accuracy, freedom from mechanical disturbance, and long-continued dependability in operation.

Having thus described my invention and illustrated its utility, I claim:

1. In an integrator having a housing, a shaft supported in said housing, and counting mechanism operated by the rotation of said shaft, the combination with a wheel fixed to said shaft, of a two-legged lever mounted for oscillation upon said shaft with the legs thereof straddling said wheel, means for oscillating said lever, a second two-legged lever rotatably mounted upon said first lever with the legs of said second lever straddling said wheel, means upon said second lever for engaging said wheel, means for controlling the point of engagement of said engaging means with said wheel, a bifurcated lever pivoted upon said shaft and straddling said wheel, said bifurcated lever being adapted to engage said second lever and thereby disengage said engaging means from said wheel, and a brake operated by said oscillating means and adapted, when said bifurcated lever is in predetermined position, to engage said bifurcated lever while the same is engaging said second lever.

2. In integrating mechanism including a shaft, a wheel fixed to said shaft, and counting mechanism operated by the rotation of said wheel, the combination of a two-legged lever rotatably mounted upon said shaft with the legs thereof straddling said wheel, means for oscillating said lever, a second two-legged lever pivoted upon said first lever with the legs of said second lever straddling said wheel, means upon said second lever for engaging said wheel, and a third two-legged lever pivoted upon said shaft and straddling said wheel, said third lever being constructed to engage said second lever to disconnect said wheel therefrom.

3. In an integrator, a time cycle assembly comprising a rigid lever having a cross arm and two perforated legs, said lever being adapted to be oscillated upon an axis passing through the perforations in said legs, a shaft adjacent said cross arm, a second lever and a plurality of pawls rotatably mounted upon said shaft, means upon said second lever for rotating said pawls when said second lever is rotated, and counterweights to balance said assembly with respect to said axis of oscillation, at least one of said counterweights being slotted to form a cam whereby said assembly may be oscillated by the rotation of a crank pin riding in said cam.

4. In an integrator, controlling means responsive to the fluctuations of a variable, said controlling means comprising two perforated lever portions connected by a cross arm and adapted to be rotated about an axis passing through said perforations, a projecting portion on each of said lever portions adapted to actuate a member by contact therewith, and a web portion adapted to be frictionally engaged with a brake to minimize reaction upon said controlling means when said projecting portions strike the member being actuated.

5. In integrating apparatus including a shaft, a toothed wheel on said shaft, and a driven pawl for rotating said wheel, the improvement in means for defining the point of engagement of said pawl with said wheel which comprises an arm pivoted upon said shaft, a plate portion on said arm covering some of the teeth on said wheel, a fixed rigid reference member, and a micrometer screw connecting the end of said arm remote from said shaft with said rigid reference member, for setting the angular position of said arm.

6. In an integrator, a time cycle assembly comprising a lever having a cross arm and two legs, a shaft piercing said legs, a second lever having a cross arm and two legs, a second shaft adjacent the cross arm on said first lever and piercing the legs of said second lever, a spring anchored to said first lever and operating upon said second lever to maintain the same in stable equilibrium when said spring is eccentric of said second shaft, at least one pawl rotatably mounted upon said second shaft, means on said second lever whereby cocking said second lever moves said pawl out of engaging position, and a cam in said first lever remote from said cross arm, for oscillating said time cycle assembly.

7. In an integrator, a time cycle assembly comprising a lever having a cross arm and two legs, a shaft piercing said legs, a second lever having a cross arm and two legs, a second shaft adjacent the cross arm on said first lever and piercing the legs of said second lever, a spring anchored to said first lever and operating upon said second lever to maintain the same in stable equilibrium when said spring is eccentric of said second shaft, at least one pawl rotatably mounted upon said second shaft, a second spring for maintaining said pawl in engaged position, means on said second lever whereby cocking said second lever moves said pawl out of engaging position, and a cam on said first lever remote from said cross arm, for oscillating said time cycle assembly.

8. In an integrator, a time cycle assembly comprising two U-shaped levers, each having a cross arm and two legs, the first of said levers being mounted for oscillation upon a shaft piercing the legs thereof, the second of said levers being rotatably mounted upon a second shaft mounted in said first lever and piercing the legs of said second lever, the cross arms of said levers being adjacent, the cross arm of said first lever acting as a stop for said second lever; at least one pawl pivoted upon said second shaft and moved out of engaging position by cocking said second lever against the cross arm of said first lever; spring means for maintaining said pawl in engaging position when said second lever is tripped; and two springs, one anchored to one leg of said first lever and the other anchored to the other leg thereof, said springs operating upon said second lever to maintain the same in tripped position after tripping and in cocked position after cocking.

MAURICE J. ZUCROW.